US010219295B2

(12) United States Patent
Hugl et al.

(10) Patent No.: US 10,219,295 B2
(45) Date of Patent: Feb. 26, 2019

(54) TRIGGERING OF REFERENCE SIGNALS AND CONTROL SIGNALING

(71) Applicant: Nokia Solutions and Networks Oy, Epsoo (FI)

(72) Inventors: Klaus Hugl, Vienna (AT); Timo Erkki Lunttila, Espoo (FI); Kari Juhani Hooli, Oulu (FI); Esa Tapani Tiirola, Kempele (FI); Sigen Ye, Whitehouse Station, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 207 days.

(21) Appl. No.: 15/154,300

(22) Filed: May 13, 2016

(65) Prior Publication Data

US 2017/0331602 A1 Nov. 16, 2017

(51) Int. Cl.
*H04W 72/14* (2009.01)
*H04W 72/12* (2009.01)
(Continued)

(52) U.S. Cl.
CPC .......... *H04W 72/14* (2013.01); *H04B 7/0626* (2013.01); *H04L 5/0048* (2013.01); *H04L 5/0051* (2013.01); *H04L 5/0055* (2013.01); *H04L 5/0057* (2013.01); *H04L 5/0094* (2013.01); *H04W 16/14* (2013.01); *H04W 28/18* (2013.01); *H04W 72/1268* (2013.01); *H04W 72/1294* (2013.01); *H04L 5/001* (2013.01); *H04L 5/0023* (2013.01)

(58) Field of Classification Search
CPC . H04W 72/1294; H04W 72/14; H04W 28/24; H04W 28/18; H04W 28/10
See application file for complete search history.

(56) References Cited

U.S. PATENT DOCUMENTS

| 2013/0078913 A1* | 3/2013 | Lee | H04L 5/0007 455/39 |
| 2016/0066343 A1 | 3/2016 | Lin et al. | |
| 2018/0048498 A1* | 2/2018 | Stern-Berkowitz | H04L 5/0048 |

OTHER PUBLICATIONS

"SRS transmission for eLAA", Huawei, HiSilicon, 3GPP TSG RAN WG1 Meeting #84, R1-160301, Feb. 2016, 8 pgs.
(Continued)

*Primary Examiner* — Ashley Shivers
(74) *Attorney, Agent, or Firm* — Harrington & Smith (57) ABSTRACT

When triggering a user equipment (UE) to send a reference signal (SRS) the network configures the UE with multiple parameter sets, each having a timing indication. The UE's resource allocation grants multiple uplink (UL) subframes and identifies/selects one of those parameter sets. The timing indication of the selected set identifies one of the granted UL subframes, in one embodiment by counting only among the allocated/granted shortened UL subframes. This triggers the UE to send SRS in that identified shortened UL subframe. In one embodiment if no UL subframes in the grant are shortened this triggers the UE to send SRS in a subframe previous to an the allocated/granted multiple UL subframes. The same mechanism can be used to trigger feedback reports such as aperiodic channel state information or block ACK/NACK reports, where the different UL signaling being triggered is requested in the network's resource allocation to the UE.

26 Claims, 5 Drawing Sheets

(51) Int. Cl.
*H04W 28/18* (2009.01)
*H04L 5/00* (2006.01)
*H04B 7/06* (2006.01)
*H04W 16/14* (2009.01)

(56) References Cited

OTHER PUBLICATIONS

"New Work Item on enhanced LAA for LTE", Ericsson, Huawei, 3GPP TSG RAN Meeting #70, RP-152272, Dec. 7-10, 2015, 8 pgs.
"$3^{rd}$ Generation Partnership Project; Technical Specification Group Radio Access Network; Evolved Universal Terrestrial Radio Access (E-UTRA); Physical layer procedures (Release 13)", 3GPP TS 36.213 V13.1.1, Section 8.2, Mar. 2016, 13 pgs.

* cited by examiner

TRIGGERING OF REFERENCE SIGNALS AND CONTROL SIGNALING

TECHNOLOGICAL FIELD

The described invention relates to wireless communications, and more particularly to the triggering the sending of sounding reference signals (SRS) and/or aperiodic channel state information (A-CSI) reports and/or block acknowledgement (block ACK/NACK) in a radio environment in which a single grant of uplink radio resources grants a given user equipment (UE) multiple uplink subframes.

BACKGROUND

Acronyms used herein are listed below following the detailed description. Rel-13 LTE LAA (Licensed Assisted Access) provides licensed-assisted access to unlicensed spectrum while coexisting with other technologies and fulfilling various regulatory requirements. As used herein, licensed refers to licensed radio spectrum such as for example conventional cellular band and unlicensed refers to license-exempt radio spectrum such as for example that used by conventional wireless local area networking utilizing various of the IEEE 802.11 radio protocols. In Rel-13 LAA, unlicensed spectrum is utilized to improve the LTE DL throughput. In this solution, one or more LAA DL SCells may be configured to a UE as part of DL CA configuration, while the PCell needs to be on licensed spectrum.

Document RP-152272 by Ericsson and Huawei entitled *New Work item on enhanced LAA for LTE* [3GPP TSG RAN Meeting #70; Sitges, Spain; 7-10 Dec. 2015] introduces unlicensed band UL operation, and includes some discussion on SRS operation in LAA.

Relatedly, the MulteFire Alliance is developing specifications for MulteFire technology which is to be a stand-alone unlicensed band operation (unlike LTE LAA which requires the assisting PCell to be in the licensed band) in which one requirement is that the MulteFire UL supports SRS. Generally the Multefire Alliance is proceeding by using certain building blocks from LTE LAA, and it is intending to also use building blocks from Rel. 14 eLAA, as much as may be appropriate in order to speed up the development of this LTE technology-based stand-alone operation in the unlicensed bands.

UL sounding reference signal transmissions are an integral part of the LTE system operation. SRS in LTE is used for UL link adaptation (including spatial and multiple-input-multiple-output (MIMO) link adaptation) as well as for UL sounding based DL precoding and link adaptation in the case of LTE TDD/FS2 (Frame Structure 2) utilizing channel reciprocity. SRS operation for unlicensed bands is being developed to have similar use cases.

UL SRSs are sent by the UE in certain specified locations of the radio frame. In relevant part for LTE, that is SRS with the trigger type 1, the UE learns when it should transmit an SRS jointly from the higher layer configured parameters and PDCCH which carries the UE's scheduling allocation. More specifically, the UE learns when it should transmit SRS from its grant of UL resources that it receives in the PDCCH combined with higher layer configuration of periodicity and timing offset of SRS opportunities in relation to the subframe number. But for unlicensed band operation in LTE LAA and in MulteFire a single PDCCH may grant to a given UE multiple UL subframes. To the inventors' knowledge, to date neither LTE LAA nor MulteFire has dealt with the issue of SRS transmissions where a single resource grant gives allocation for multiple UL subframes.

Typically it is not useful for the network to receive an SRS in each of those multiple granted UL subframes since generally the channel conditions across those at least some of those multiple UL subframes would be coherent and a single SRS could adequately represent the channel across all those channel-coherent subframes. If the UE were to always send an SRS in each of those multiple coherent UL subframes all but one of those SRSs would generally represent wasted signaling. At the same time a multiple UL grant in a single PDCCH is generally given to high-traffic UEs, so abstaining completely from receiving SRSs from those particular UEs in those scheduling events would tend to reduce throughput efficiency (by not having precise channel soundings) on the busiest connections. What is needed in the art is a way for the network to instruct or otherwise control the UE to send SRS in only selected ones (if any) of the multiple UL subframes granted in a single PDCCH, and to do so in an efficient way that does not add too much to the control signaling overhead on the unlicensed band. As will be described below, the solution herein for triggering the UE to send SRS works quite well also for triggering the UE to send aperiodic channel state information (CSI) reports which give the network information on quality of the UE's downlink channel, or block ACK/NACK.

SUMMARY

In a first aspect of these teachings there is a method for transmitting a reference signal and/or a channel state information (CSI) report and/or a block acknowledgement. In this aspect the method comprises a) receiving a configuration of multiple parameter sets each set including a timing indication; b) receiving a grant that allocates multiple uplink subframes; c) based on the grant, determining which of the multiple allocated uplink subframes are shortened such that uplink transmission is prohibited in only a portion thereof; d) determining from the grant that a reference signal and/or CSI report and/or block acknowledgement is requested; e) determining from the grant a selected one of the multiple parameter sets; f) identifying one uplink subframe based on the determination which of the multiple allocated uplink subframes are shortened; and g) transmitting the reference signal and/or the CSI report and/or block acknowledgement as requested by the grant in the identified uplink subframe.

In a second aspect of these teachings there is a computer readable memory storing computer program code that when executed by one or more processors of a user equipment cause the user equipment to perform at the above method.

In a third aspect of these teachings there is an apparatus comprising at least one processor, and at least one memory storing computer program code, which together are all configured to cause a user equipment (UE) to transmit a reference signal and/or a or channel state information (CSI) report and/or a block acknowledgement. More specifically, they are configured to cause the UE to at least: in response to receiving a configuration of multiple parameter sets each set including a timing indication and a grant that allocates multiple uplink subframes, determine based on the grant which of the multiple allocated uplink subframes are shortened such that uplink transmission is prohibited in only a portion thereof; determine from the grant that a reference signal and/or CSI report and/or block acknowledgement is requested; determine from the grant a selected one of the multiple parameter sets; identify one uplink subframe based on the determination which of the multiple allocated uplink subframes are shortened; and transmit the reference signal and/or the CSI report and/or block acknowledgement as requested by the grant in the identified uplink subframe.

In a fourth aspect of these teachings there is a method for triggering transmission of a reference signal and/or a channel state information (CSI) report and/or a block acknowledgement. In this aspect the method comprises: a) transmitting to a user equipment (UE) a configuration of multiple parameter sets each set including a timing indication; b) determining multiple uplink subframes to be scheduled to a UE; c) identifying one uplink subframe in which the UE is to transmit a reference signal and/or a CSI report and/or block acknowledgement; d) selecting one of the multiple parameter sets, wherein for the case in which at least one of the multiple uplink subframes is shortened such that uplink transmission is prohibited in only a portion thereof the timing indication of the selected parameter set indicates the identified one uplink subframe from among the multiple uplink subframes; and e) transmitting to the UE a grant that schedules the UE for the multiple uplink subframes and that triggers the UE to transmit a reference signal and/or a CSI report and/or block acknowledgement, the grant further identifying the selected parameter set and which if any of the multiple uplink subframes are shortened.

In a fifth aspect of these teachings there is a computer readable memory storing computer program code that when executed by one or more processors of a radio access node cause the radio access node to perform the method according to the above fourth aspect of these teachings.

And in a sixth aspect of these teachings there is apparatus comprising at least one processor, and at least one memory storing computer program code, which together are all configured to cause a radio access node to trigger transmission of a reference signal and/or a channel state information (CSI) report and/or a block acknowledgement. More specifically, they are configured to cause the radio access node to at least: transmit to a user equipment (UE) a configuration of multiple parameter sets each set including a timing indication; determine multiple uplink subframes to be scheduled to a UE; identify one uplink subframe in which the UE is to transmit a reference signal and/or a CSI report and/or block acknowledgement; select one of the multiple parameter sets, wherein for the case in which at least one of the multiple uplink subframes is shortened such that uplink transmission is prohibited in only a portion thereof the timing indication of the selected parameter set indicates the identified one uplink subframe; and transmit to the UE a grant that schedules the UE for the multiple uplink subframes and that triggers the UE to transmit a reference signal and/or a CSI report and/or block acknowledgement, the grant further identifying the selected parameter set and which if any of the multiple uplink subframes are shortened.

DETAILED DESCRIPTION

Certain of the examples below detail a triggering mechanism for SRS transmission for unlicensed band operation, specifically considering multi-subframe grant UL scheduling operation. While the LTE terminology is utilized for improved clarity in describing exactly how these examples might work, the LTE radio access technology is not a limiting factor in the broader teachings herein so the LTE names such as PDCCH and PUSCH, number of symbols per LTE subframe, and the like are not limiting either.

For the reader not familiar with these particulars, following is a summary of certain agreements in LTE LAA/enhanced LAA concerning SRSs, as a background for a better understanding of the inventors' SRS triggering mechanisms that are more fully detailed in the below examples. For Rel-14, it has been agreed that SRS for eLAA is to be transmitted in last symbol of UL subframe, and further agreed that SRS for eLAA is to use the waveform of licensed band LTE transmitted over the (almost) full UL bandwidth. In the case of 20 MHz this full eLAA UL bandwidth corresponds to 100 UL PRBs and SRS bandwidth may correspond to 96 PRBs. Frequency-selective, narrowband SRS transmission is not supported for eLAA (though it is supported in licensed band LTE SRS).

Further, several other agreements came out of the April 2016 RAN1 Meeting #84bis, namely:
 SRS, if present in a UL subframe, is transmitted at the end of the subframe
 Only wideband SRS transmission in supported in eLAA
  The existing max number of SRS RBs for a given system bandwidth is the baseline
   It is for further study whether or not to extend/shift to # of RBs >max #PRBs in the legacy case
  One working assumption is that SRS is based on a legacy comb structure
   As a baseline, comb=2 and 4
   It is for further study whether or not support different comb value(s)

Figure 1A:
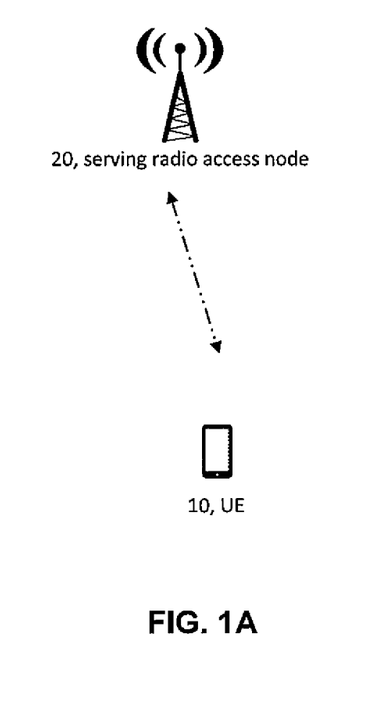
FIG. 1A is a schematic diagram illustrating an example of two radio communication devices that may be used to implement certain embodiments of these teachings may be practiced.

FIG. 1A is a schematic diagram of two communication devices that are suitable for implementing embodiments of these teachings. A serving radio access node 20 represents the network side of the wireless divide that sends the resource allocation grant downlink and which also triggers the SRSs. FIG. 1A also shows a user equipment UE 10 which represents the mobile terminal side that sends the SRSs uplink (and also sends its aperiodic CQI reports that inform the network of the downlink channel conditions seen by the UE 10). There may be further UEs in the access node's cell but for purposes of this description those others operate similar to the illustrated and described UE 10 with respect to the different signaling they receive from the network. While the radio access node 20 in the examples below is referred to as an eNB, this is not a conventional LTE eNB in that the signaling described herein is on unlicensed spectrum and also the specific signaling described below is not conventional LTE signaling.

Figure 1B:
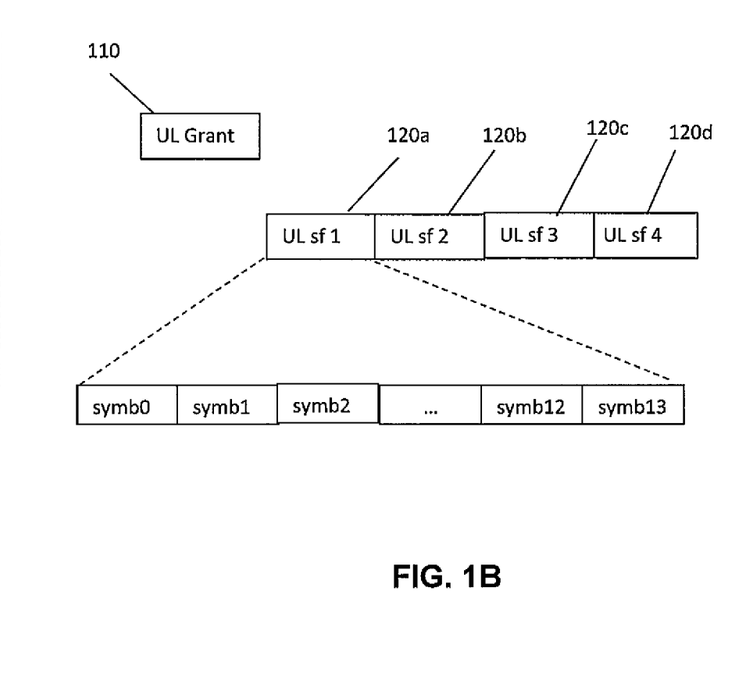
FIG. 1B is a schematic diagram showing a PDCCH, granted UL subframes, and symbol positions within a single subframe that are relevant to the examples herein.

FIG. 1B is a schematic diagram showing an UL grant on the DL control channel 110 (more generically, a resource allocation or resource grant), multiple UL subframes 120a-d which are granted by that single PDCCH, and the symbols in an LTE subframe such as in each of those granted UL subframes 120a-d. LTE LAA only supports the 'normal' length cyclic prefix (CP) and thus the granted UL subframes 120a-d in LTE LAA contain 14 OFDM symbols or 14 SC-FDMA symbols, which as conventional are indexed from #0 to #13 such that the symbol in the first-in-time position of the subframe is position #0 (denoted symb0 in FIG. 1B), and so forth for the other symbol positions through the last position #13 of the subframe. 3GPP as well as the MulteFire Alliance has agreed to support such UL multi-subframe scheduling with a single UL grant. With this operation, a single UL grant 110 is able to schedule several UL subframes in order to reduce the (DL) control load and to enable scheduling of more than a single UL subframe from a single DL subframe. This is seen to be most useful in the case of UL heavy traffic, and related UL heavy UL/DL resource partitioning of the unlicensed band carrier.

In order to enable SRS transmission in the last symbol of a subframe (symbol #13 of an UL subframe 120a-d), the UE cannot transmit a PUSCH in the last symbol in any subframe where any other UE is transmitting SRS. For a UE with its own SRS transmission this is straightforward, but it is important to understand that in any given subframe, if one UE is transmitting SRS then no other UEs in the cell can transmit PUSCH in the same symbol position as that other UE's SRS transmission, even if those other UEs are not transmitting their own SRS.

This gives rise to the need for the radio network to signal if a PUSCH transmission in a granted UL subframe should not include PUSCH in symbol position #13 even if the network is not requesting that UE to transmit SRS itself. This is consistent with an agreement already in 3GPP that that there is to be a dynamic indication for the last PUSCH symbol in a subframe. More specifically the April 2016 RAN1 Meeting #84bis resulted in the following further agreements, of which the second bullet is most relevant:

Dynamic signaling indicates whether PUSCH in a UL subframe is transmitted from
Start of DFTS-OFDM symbol 0 or
Start of DFTS-OFDM symbol 1
It is for further study if PUSCH can be transmitted within DFTS-OFDM symbol 0
Dynamic signaling indicates whether PUSCH in a UL subframe is transmitted up to OFDM symbol 13 or OFDM symbol 12
Any combination of the above options can be enabled by the dynamic signaling The April 2016 RAN1 Meeting #84bis resulted in additional agreements below, but note that the italicized bullet below indicates that the SRS request/triggering mechanism is still open for the multi-subframe scheduling operation shown by example at FIG. 1B:

DCI format(s) to schedule PUSCH transmission in k<=N subframes with single TB per subframe or two TBs per subframe
Value(s) of N is for further study
Value N is either semi-statically configured or hard-coded, to be further decided
DCI format(s) will have the following scheduling information types:

Type A: common to all the scheduled subframes (appearing only once in a DCI)
carrier indicator, resource assignment, Cyclic shift for DM RS and OCC index
Type B: subframe specific information (appearing N times for N subframes scheduling)
NDI
It is for further study whether MCS is type A or type B
It is for further study whether HARQ process number and redundancy version are type A or type B
It is for further study about details of scheduling timing indication, and whether it's type A or type B
It is for further study whether Type C is to be applied only to one of the scheduled subframes (appearing only once in a DCI)
CSI request, SRS request, TPC
Note: there are maybe other information fields in DCI, to be decided later Note that the DCI formats immediately above may not be a complete list, the allowed DCIs may depend on further discussions in 3GPP on resource allocation for PUSCH. In LTE the DCI format refers to the format of the PDCCH.

Embodiments of these teachings concern triggering the UE to send SRS, taking the dynamic PUSCH allocation signaling into account. For the case of a resource grant allocating only a single UL subframe the problem is not very difficult; the SRS can be triggered for the single UL subframe or not as is the case for conventional LTE. But for the case of a multi-subframe UL grant, a SRS request can apply to any one or more of the multiple UL scheduled subframes. For convenience assume the single resource allocation grant allocates a number of k subframes, where k is an integer greater than one. Embodiments of these teachings as detailed further below provides efficient design of the SRS request/trigger, which is suitable for eLAA and/or MulteFire UL multi-subframe scheduling. Similar principles can be applied also in other systems such as 5G New Radio configured to operate according to rules defined for unlicensed band operation and/or multi-subframe scheduling. Specifically, the examples below consider how to efficiently indicate to the UE in which of the allocated PUSCH subframes it should transmit the SRS while still providing sufficient flexibility. Note that the invention assumes that unlike LTE on licensed band, there is no pre-configured set of subframes for potential SRS transmissions, meaning that any subframe can potentially be dynamically triggered for SRS transmission. This can improve the resource efficiency and the flexibility on unlicensed band considering the listen-before-talk required before a transmission and limited transmission burst duration.

In one aspect embodiments of these teachings may be considered as a compact joint signaling of SRS timing as well as SRS transmission configuration. This joint signaling is interpreted by the UE in combination with another dynamic signaling that indicates whether PUSCH transmission in the last symbol of a subframe, that is, in symbol #13 of the given PUSCH subframe is allowed by this UE or not.

As a starting point assume that with a single UL multi-subframe grant, only a single SRS transmission can be requested of the UE, though this transmission may be done with one or more antenna ports. This follows from the channel coherence assumptions noted in the background section above; it is reasonable that channel conditions in the subframes belonging to the same UL multi-subframe grant are highly correlated, and thus adequately represented by a single SRS from this UE.

In relevant part, firstly the UE is configured with a number J of different SRS parameter sets, where J is an integer greater than one. In the specific example below J=3 SRS parameter sets can be configured for the UE; this is preferred for implementation with eLAA since it can be signaled with 2 bits and already conventional LTE in the licensed band for UL transmission mode (TM) 2 operation 2 bits are used for SRS signaling. In other embodiments there may be J=7 SRS parameter sets, which can be implemented using 3 bits to signal the UE which SRS parameter set is active for a given multi-subframe UL grant.

In one embodiment the SRS parameter sets are configured for the UE using higher layer signaling, for example Radio Resource Control (RRC) signaling which is a higher logical layer than the physical PHY layer and the media access control MAC layer. Utilizing multiple SRS parameter sets enables the network to increase the efficiency and flexibility of the SRS resource usage. Multiple UEs in the cell will typically be configured with the same SRS resources. The eNB selects the SRS resources depending on which UEs are triggered to send SRS.

Conventional LTE UL TM2 operation in the licensed band also uses SRS parameter sets but the parameter sets according to these teachings differ in the following ways at least. A first such difference is that each SRS parameter set according to these examples contains a time component parameter that indicates in which UL subframe the SRS is requested to be transmitted in relation to the first scheduled UL subframe. In conventional LTE UL operation the SRS parameter set contain parameters that indicate the periodicity and subframe offset for subframes where the UE may transmit SRS. The timing is indicated in relation to subframe number, i.e. relative to radio frame time. Due to flexibility of UL multi-subframe scheduling, it is desirable to have a high level of flexibility on the definition and application of the SRS parameter sets. Hence, the SRS subframe indication is done relative to the scheduled subframes that end their PUSCH transmission with symbol 12, and it is the other dynamic signaling from the network that tells the UE which PUSCH subframes the UE is restricted from sending PUSCH in symbol position #13. Typically, both dynamic signaling fields (i.e. SRS triggering and PUSCH shortening) are included in the same UL resource allocation grant.

Each parameter set relates to the $x^{th}$ UL subframe within an UL SF grant where the PUSCH is ending in symbol position #12; these are the 'shortened' UL subframes. So for example some specific SRS request applies to the $1^{st}$, or to the $2^{nd}$, or to the $3^{rd}$, (etc.) scheduled PUSCH subframe ending in symbol 12. The value of x is one of the RRC configured parameters in each of the different SRS parameter sets.

Some parameters of the conventional LTE SRS parameter sets, such as for example SRS bandwidth (BW) and frequency position, might not be needed for implementations of these teachings for unlicensed band deployments. For example and as mentioned above, only wideband SRS transmission is supported for conventional/licensed band 3GPP eLAA. This may be implemented in a way that 3GPP eLAA solution does not contain related parameters in the RRC signalling. Another option is to keep the current RRC signalling unchanged, and leave it up to the eNB to make the configuration according to 3GPP eLAA rules. It is also possible to define valid parameter values for the eNB, when using current RRC The UL multi-subframe grant sent on the unlicensed band contains a 2-bit SRS trigger. As mentioned above, in other embodiments this may be a 3-bit trigger or some other number of bits, depending on how many SRS parameter sets there are in the list stored locally at the radio access node 20 and at the UE 10. 2-bits is preferred for ready adaptation of these teachings for eLAA LTE, so as to re-use the LTE triggering mechanism for different SRS sets. For the case in which embodiments of these teachings adopt the LTE SRS parameter sets directly (but modified to include at least the timing parameter), the following bit values from table 8.1.1 at section 8.2 UE sounding procedure of 3GPP TS 36.213 v13.1.1 can be used (section 8.2 of 3GPP 36.213 v 13.1.1 is hereby incorporated by reference as if re-stated herein):

| SRS request values for trigger type 1 in DCI format 4 | |
|---|---|
| Value of SRS request field | Description |
| '00' | No type 1 SRS trigger |
| '01' | The $1^{st}$ SRS parameter set configured by higher layers |
| '10' | The $2^{nd}$ SRS parameter set configured by higher layers |
| '11' | The $3^{rd}$ SRS parameter set configured by higher layers |

Based on the 2-bit (or other numbers of bits) SRS triggering alone the UE is not able to identify the UL subframe for SRS transmission; the SRS triggering value only tells the UE which parameter set to select from its parameter set list. The subframe of the multiple-granted UL subframes in which the SRS transmission is triggered is only determined when combining the indicated applicable SRS parameter set (and in particular the value of the timing parameter x) together with the information on the PUSCH subframes ending with symbol 12 (e.g., those PUSCH subframes in which PUSCH transmissions in symbol position #13 are barred).

In one particular embodiment, the UE uses a modulo/cyclic operation for determining the SRS subframe from among the N multiple-granted UL subframes; this increases the SRS request flexibility for a small number of shortened PUSCH subframes. It should be noted that the number of shortened PUSCH subframes may vary between consecutive multi-subframe scheduling. Thanks to modulo/cyclic operation detailed further below the solution described herein scales also to the case where the eNB schedules just one shortened PUSCH subframe among the k multiple-granted UL subframes. This means that all SRS parameter sets may be available for the UE also in the case of just one shortened PUSCH subframe.

For the case in which UE is configured by the network to transmit SRS with multiple antenna ports, the UE transmits its SRS from all of those configured antenna ports in the same UL subframe. Obviously, different SRS parameter sets may relate to different shortened PUSCH subframes also with multiple antenna ports. In another embodiment different MIMO profiles can be configured for the UE for the different SRS parameter sets. As an example of this, one SRS parameter set could be configured with single-antenna port SRS, whereas two other SRS parameter sets can be configured with multi-antenna port SRS respectively.

As mentioned above, the timing and triggering mechanism can also be used for triggering the UE to send aperiodic CSI reports (A-CSI) and/or block acknowledgement. A block acknowledgement comprises HARQ acknowledgements (or HARQ negative acknowledgements) for all relevant DL HARQ processes and is transmitted by the UE after receiving a trigger in the UL grant from the eNB for sending block ACK/NACK. The relevant DL HARQ processes could be all the DL HARQ processes, or all the DL HARQ processes in use, or some other subset of the DL HARQ processes. But the exact definition of the relevant DL HARQ processes to be included in the block ACK/NACK is out of the scope of this invention. Specifically, when a resource allocation from the network grants multiple UL subframes to the UE and further triggers the UE to send an A-CSI and/or block ACK/NACK, the above signaling mechanism can be used to identify to the UE which of those multiple-granted UL subframes in which to send its A-CSI report and/or block ACK/NACK. When combined with SRS transmissions, the exact same signaling bits can inform the UE which of those multiple-granted UL subframes in which to transmit its SRS and/or A-CSI report and/or block ACK/NACK so that whichever of these transmissions are triggered by the grant can be sent in the same UL subframe.

A-CSI report and/or block ACK/NACK is different from SRS in the sense that the A-CSI report and/or block ACK/NACK do not have to be sent in a shortened PUSCH subframe. They can be sent in any scheduled subframe. While sharing the same signaling bits with SRS, an alternative approach is to interpret the bits differently for A-CSI report and/or block ACK/NACK. Instead of having the parameter x indicating the SRS subframe relative to the scheduled shortened PUSCH subframes, it can be interpreted as an indication relative to all the scheduled PUSCH subframes for A-CSI report and/or block ACK/NACK. In this case, the signaling bits do not need to be interpreted jointly with the information on the shortened PUSCH subframes.

Given the difference between SRS and A-CSI report and/or block ACK/NACK, instead of sharing the same signaling bits, separate signaling bits can be used for each of them, or any two of them can share the same signaling bits, while the signaling mechanism still follow the same principle as described. The parameter set that include the subframe indication can also be configured separately. For example, the triggering bits for A-CSI already exist in the UL resource allocation grant today, and it can be potentially reused or modified to also indicate the subframe.

The following summarizes the signaling mechanism and resulting actions from the perspective of the UE 10, and represents a method for transmitting SRS (or Aperiodic CSI reports or block acknowledgement) when UL multi-subframe scheduling is applied. Firstly the UE receives a SRS (and/or A-CSI and/or block acknowledgement) parameter set configuration that includes a timing indication. In the example above the configuration is sent to the UE using higher layer signaling such as via the UE's RRC configuration in the cell. Further in the above example the timing indication is relative to the scheduled PUSCH subframes that are shortened from the end (those in which PUSCH is not allowed for symbol position #13).

Next, based on the UL multi-subframe grant the UE determines the UL subframes where PUSCH transmission in symbol #13 is not allowed (i.e. shortened PUSCH subframes). Based on this same UL multi-subframe grant the UE also determines if an SRS transmission is requested by the network, and if SRS transmission is requested the UE further determines from the UL multi-subframe grant which SRS parameter set is used (e.g., the 2-bit or 3-bit value).

From this determined SRS parameter set the UE then determines a value of the parameter x, which indicates the shortened UL subframe in which SRS should be transmitted relative to other shortened UL subframes allocated by the grant. So for example the SRS parameter set identified by bit value "11" may have a parameter x=3 that tells the UE it is to transmit SRS in the $3^{rd}$ shortened UL subframe that was allocated by the grant, while the SRS parameter set identified by bit value "10" may have a parameter x=2 that tells the UE it is to transmit SRS in the $2^{nd}$ shortened UL subframe that was allocated by the grant (here, 'shortened' means PUSCH transmission in symbol position #13 is prohibited for that subframe). For the embodiment below that utilizes a modulo operation the value of x does not directly count off the shortened UL subframes that are allocated by the grant and the specific subframe for SRS is given by the value for n as detailed immediately below. For clarity, the signaled parameter in the SRS parameter set is referred to as x and the specific shortened subframe for the SRS transmission is referred to as n, and so in the simplest non-modulo operation implementation n=x which is true for the above example.

Now based on the determined UL subframes where PUSCH transmission in symbol #13 is not allowed, and the parameter x, the UE can easily determine the UL subframe for its SRS transmission. In a first embodiment n=x or more generically the determination of the specific UL subframe for SRS transmission does not entail any modulo operation, but in an alternative second embodiment this determining of the UL subframe for SRS transmission may include a modulo/cyclic operation. As an example of the latter, where the SRS is to be transmitted in the $n^{th}$ UL subframe that PUSCH transmission in symbol #13 is not allowed, the positive integer n may be defined as n=mod(x, number of UL subframes where PUSCH transmission in symbol #13 is not allowed), where the value for x is given in the selected SRS parameter set and the number of shortened UL subframes is given by the grant itself.

Now having identified the specific (shortened) UL subframe of the multiple-granted UL subframes, the UE then transmits SRS (and A-CSI report if the grant also triggered A-CSI) in the determined UL subframe for SRS transmission. The other SRS parameters apart from the timing parameter that are also within the selected SRS parameter set (for example, parameters to identify the SRS sequence, the IFDMA-comb, the cyclic shift, and so forth) are as configured for the determined SRS parameter set.

The above described method from the UE's perspective can also represent functions executed by computer code of a software program tangibly stored on a computer readable memory for implementing these teachings, or functions to control operation of a UE as performed by one or more processors in cooperation with one or more computer readable memories storing software computer code.

Now are summarized the signaling mechanism and relevant actions from the perspective of the network such as the radio access node 20, and represents a method for triggering a UE to transmit SRS (or Aperiodic CSI reports) when UL multi-subframe scheduling is applied. Firstly the network transmits to the UE a SRS parameter set configuration including a timing indication for a UE. As mentioned above in some embodiments this configuration is sent to the UE using higher layer signaling such as the UE's RRC configuration. In the above example the timing indication is relative to the number of scheduled shortened PUSCH subframes.

With the UE configured with the list of SRS parameter sets the network determines multiple UL subframes to be scheduled to a UE, and of those multiple UL subframes it also determines those UL subframes which are to be shortened subframes (e.g., those where PUSCH transmission in symbol position #13 is not allowed). For the case in which the network also determines that an SRS transmission is needed from this UE the network will further determine or choose in which of the scheduled shortened UL subframes the UE should transmit this SRS. As noted above, this is referred to as the nth shortened UL subframe and so at this step the network determines the value for n. If in the deployed embodiment the UE is to perform a modulo operation on the signaled value x then the network determines x according to n=mod(x, number of UL subframes where PUSCH transmission in symbol #13 is not allowed). Else if in the deployed embodiment the UE is not going to use any modulo operation then the network determines x as n=x where x directly identifies the exact shortened UL subframe relative to the other granted shortened UL subframes. These are of course two specific but non-limiting examples. One advantage of the modulo operation is that it enables the applicability of more than one SRS parameter set in case only a small number of shortened UL subframes are scheduled, as is detailed below with respect to FIG. 3.

Now knowing x, the network selects the SRS parameter set that corresponds to it (e.g., the SRS parameter set that includes the value for parameter x that matches the value for x found by the network as above). The network completes its actions by transmitting a multi-subframe UL grant to the UE that includes an indication of the scheduled shortened UL subframes (where PUSCH transmission in symbol #13 is not allowed) and an indication of the selected SRS parameter set. So long as the UE transmits as instructed the network will then receive the SRS from the UE based on the combination of the indicated SRS parameter set and the indication of the scheduled UL subframes where PUSCH transmission in symbol #13 is not allowed.

The above described method from the network's perspective can also represent functions executed by computer code of a software program tangibly stored on a computer readable memory for implementing these teachings, or functions to control operation of a radio access node 20 as performed by one or more processors in cooperation with one or more computer readable memories storing software computer code.

Figure 2:
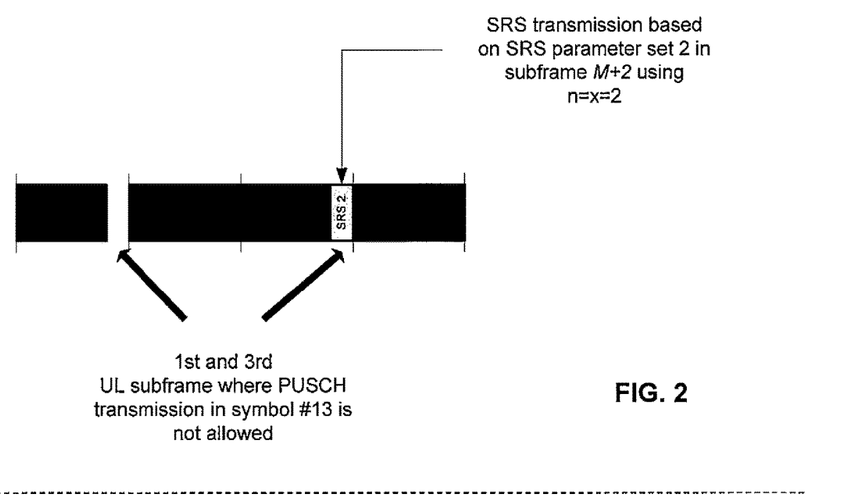
FIG. 2 is a schematic diagram of multiple granted UL subframes granted in a single grant according to a first embodiment in which no cyclic or modulo operation is applicable for triggering the UE to send SRS.
Figure 3:
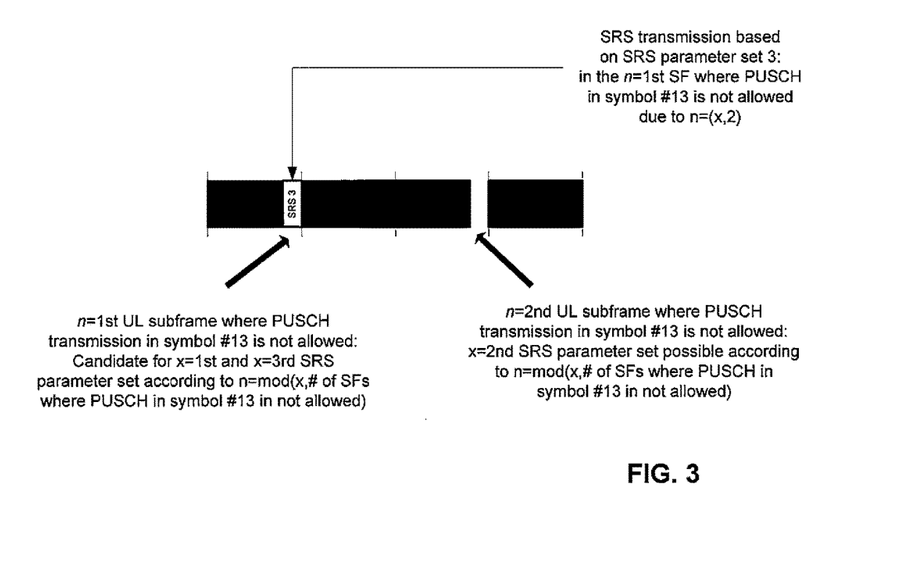
FIG. 3 is a schematic diagram similar to FIG. 2 but according to a second embodiment in which cyclic or modulo operation is utilized to trigger the UE to send SRS.

Now consider a specific example which FIGS. 2 and 3 illustrate certain differences between the embodiments in which n=x and n=mod(x, number of UL subframes where PUSCH transmission in symbol #13 is not allowed), respectively. The non-modulo operation illustrated at FIG. 2 will be considered a first embodiment and the modulo operation illustrated at FIG. 3 will be considered a second embodiment. In this example the network configures the UE with 3 SRS parameter sets, and the network sends to the UE a single grant of resources that allocates 4 UL subframes beginning at subframe #M.

In this example the three SRS parameter sets configured to the UE 10 are as follows:

Set 1: Generic SRS parameter set 1 (IFDMA-comb1, cyclic shift1, etc.) including parameter x indicating SRS transmission in the $1^{st}$ shortened PUSCH subframe (x=1)

Set 2: Generic SRS parameter set 2 (IFDMA-comb2, cyclic shift2, etc.) including parameter x indicating SRS transmission in the $2^{nd}$ shortened PUSCH subframe (x=2)

Set 3: Generic SRS parameter set 3 (IFDMA-comb3, cyclic shift3, etc.) including parameter x indicating SRS transmission in the $3^{rd}$ shortened PUSCH subframe (x=3)

The different SRS parameter sets can use the same parameter values to a certain extent; it is sufficient that each set deviates from others by at least one parameter value.

In the case when the UE is configured to transmit SRS from multiple antenna ports, SRS transmission parameters for each antenna port may be implicitly derived from the one set-specific cyclic shift and comb value which are explicitly configured via RRC signaling. Alternatively the antenna ports may be explicitly configured by the network (for example via RRC signaling) for each SRS parameter set and each antenna port.

Further in this example, of the four UL subframes allocated by the single multi-subframe grant there are exactly two shortened subframes, those in which PUSCH transmission in symbol #13 is not allowed. These shortened subframes are subframes M and M+2, and these are specifically identified in the UL multi-subframe grant itself.

For the first embodiment at FIG. 2, assume the SRS parameter set 2 above is signaled to the UE using a bit-value "10". With no modulo operation in this embodiment n=x, and in the SRS parameter set 2 the value for x is 2. Since the specific UL subframe for SRS is n and in this first embodiment n=x, it is the $2^{nd}$ subframe where PUSCH transmission in symbol#13 is not allowed where the UE is to send its SRS. In this example that specific subframe is subframe M+2. If we assume that the grant allocates 4 consecutive UL subframes M, M+1, M+2 and M+3, then subframe M+2 is the third scheduled UL subframe but still it is only the second shortened UL subframe that is allocated by the grant, and it is the shortened UL subframes that the value of n counts.

This is shown at FIG. 2 in which there are a total of k=4 UL subframes allocated by the grant, subframes M and M+2 are the only shortened subframes (thus there are 2 shortened UL subframes allocated to the UE by the grant), and parameter set 2 with the relative timing indication x=2 above identifies the second of these shortened subframes (since n=x in this first embodiment) as the one in which the UE is to transmit SRS (and also an A-CSI report and/or block ACK/NACK if the scheduling grant further requested it). For this FIG. 2 example the UE will transmit its SRS in PUSCH UL subframe M+2 using further parameters defined in the entire SRS parameter set 2 above, namely IFDMA-comb2, cyclic shift2, etc. In other adaptations/variations of this SRS example, the UE will also send in PUSCH UL subframe M+2 whichever feedback (A-CSI and/or block ACK/NACK) report is/are triggered by the same resource grant that triggered the SRS.

The determination of the subframe M+2 for the UE's SRS transmission utilizes a combination signaling principle because it takes both dynamically signaled indications into account; the scheduling allocation of UL subframes (of which one or more of them are shortened) as well as the selected SRS parameter set which only selects a specific subframe on a relative basis in view of the overall UL grant that includes x shortened UL subframes.

For the second embodiment at FIG. 3, assume the SRS parameter set 3 above is signaled to the UE using a bit-value "11". With the modulo operation in this embodiment n=mod (x, number of UL subframes where PUSCH transmission in symbol #13 is not allowed), and in the SRS parameter set 3 the value for the relative timing indication x=3 and there are a total of two shortened UL subframes in the grant. Therefore the subframe in which the UE is to transmit SRS is given by n=mod(x=3, 2) which yields a value of n=1.

As above and as shown in FIG. 3, the k=4 allocated UL subframes are M, M+1, M+2 and M+3 and of these only M and M+2 are shortened. The value of n identifies which of these shortened subframes is the one in which the UE is to send SRS, and FIG. 3 illustrates the SRS is transmitted in subframe M. For this FIG. 3 example the UE will transmit its SRS in PUSCH UL subframe M using the entire SRS parameter set 3 above, namely IFDMA-comb3, cyclic shift3, etc. In other adaptations/variations of this SRS example, the UE will also send in PUSCH UL subframe M whichever feedback (A-CSI and/or block ACK/NACK) report is/are triggered by the same resource grant that triggered the SRS.

Due to the applied modulo operation in this second embodiment, for this example having only having 2 shortened PUSCH subframes in the grant the eNB/radio access node 20 can, to trigger SRS in the n=1$^{st}$ subframe where PUSCH in subframe #13 is not allowed, choose from two SRS parameter sets which each yield the same result n=mod(x,2)=1. Namely, the eNB can choose SRS parameter set 1 using (IFDMA-comb1, cyclic shift1, etc.) or it can choose SRS parameter set 3 using (IFDMA-comb3, cyclic shift3, etc.), either choice will yield n=mod(x,2)=1. This will increase the flexibility for the eNB/radio access node 20 for SRS transmission without increasing the related signalling overhead.

In certain scenarios the eNB may want use a shortened subframe that can possibly be used for an SRS transmission for providing extra time for a Listen Before Talk (LBT) procedure. LBT is a common technique to avoid interference on unlicensed spectrum because there may be other mobile devices on the same spectrum that are not affiliated with the eNB, or that are sending an initial transmission to associate with it, so for example the eNB may wait some LBT period of time before transmitting. In this case the eNB would not trigger any SRS in the last subframe of an UL transmission burst. Instead, the eNB would reserve an empty SRS symbol to ensure that there is sufficient time for the eNB's LBT period at the end of an UL transmission burst that the eNB scheduled so that the eNB can start the next DL transmission burst at the subframe boundary. The eNB may take this kind of operation into account when configuring SRS parameter sets by minimizing the number of SRS sets in which n selects a last subframe of the UL transmission burst scheduled by the eNB's grant of multiple UL subframes.

One technical effect of implementing embodiments of these teachings is that they allow for a compact SRS request with multi-subframe grants enabling different generic SRS parameter sets (IFDMA-comb, cyclic shift, etc.), and at the same time allowing the network to choose the specific subframe for SRS transmission without sacrificing much away from total flexibility. For example, in the case of a single UL subframe where PUSCH transmission in symbol #13 is not allowed, all 3 different generic SRS parameter sets (IFDMA-comb x, cyclic shift x, etc.) can be freely chosen for the second embodiment that utilizes a modulo operation because n=mod(x,1) leads n=1 regardless of the value for x in the different SRS parameter sets.

Contrasting against a separate parameter set and timing indication, the DCI overhead can be reduced dramatically by these teachings; for example only 2 bits instead of ceiling $(\log_2(N))+2$ bits (where N subframes can be scheduled from a single UL multi-subframe grant). In this case 2 bits identify one set of SRS parameters (IFDMA-comb, cyclic shift, etc.) and there are ceiling($\log_2(N)$) bits for the time location of the SRS transmission (assuming as in the above non-limiting examples that these ceiling($\log_2(N)$) timing bits are totally independent of the indication of PUSCH ending with symbol 12).

Embodiments of these teachings further enables a flexible utilization of SRS resources while minimizing the SRS overhead. For example, the number of SRS symbols within a UL transmission burst can be adjusted dynamically based on the number of UEs transmitting SRS.

Above the concept of signaling block ACK/NACK and triggering it are discussed in the context of eLAA and MulteFire on unlicensed spectrum. Block ACK/NACK in these contexts is a part of these teachings. In LTE operation with licensed band UL SCells, HARQ-ACK feedback follows deterministic/predetermined timing where the HARQ-ACKs for PDSCH TBs are carried in the first available UL subframe no earlier than in subframe n+4. However, with HARQ-ACK transmission on eLAA SCells subject to Listen-Before-Talk requirements, the channel access mechanisms bring uncertainty to the availability of HARQ-feedback channel (PUCCH or PUSCH) at a given point in time. Because of this, eLAA operation cannot rely on predetermined HARQ-ACK timing, and mechanism(s) to cope with unexpected delays in HARQ-ACK feedback are needed. The block ACK/NACK technique disclosed herein is such a mechanism.

While the scenario where LBT procedure affects HARQ-ACK feedback is new to LTE, similar considerations have taken place in the context of other technologies used in unlicensed spectrum. As an example Wi-Fi (namely 802.11e/n) supports a mechanism called Block Acknowledgement, where one station may request another to provide acknowledgements for several frames using a bitmap [2]. Similar approach seems useful and necessary also in eLAA, particularly as it allows for keeping all the HARQ-feedback on the unlicensed carriers even if UL transmission need to be suspended from time to time due to LBT.

In the context of LTE, and given the uncertainty in the timing for HARQ-ACK feedback, it is natural to relate the Block-ACK directly to HARQ-processes rather than subframes. This help in avoiding ambiguity that the LBT requirements along with very flexible UL-DL "configurations" inevitably creates. As for the triggering mechanism itself, the straightforward solution is to re-use the Aperiodic CSI triggering principles, with 2-3 bits in the UL grant indicating the carriers for which Block-ACK should be reported using PUSCH. This allows for managing the overhead associated with HARQ-ACK feedback by triggering feedback for only some of the carriers. The resource allocation as well as channel coding principles can be directly borrowed from A-CSI framework.

Figure 4A:
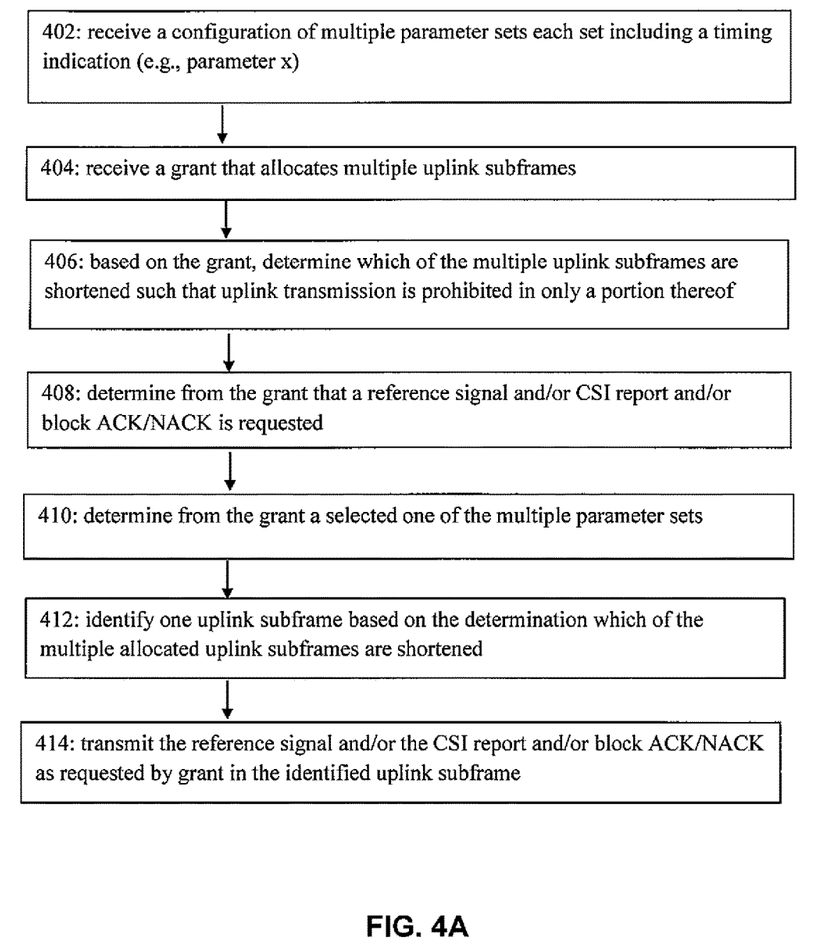
FIGS. 4A-B are process flow diagrams summarizing certain of the above teachings from the perspective of the UE and from the perspective of the serving network radio access node, respectively.

FIG: 4A is a process flow diagram that summarizes some of the above aspects from the perspective of the UE 10 or other mobile device. FIG. 4A details a method for transmitting a reference signal or channel state information (CSI) report. In this summary at block 402 the UE receives a configuration of multiple parameter sets each set including a timing indication; the parameter x in the above examples is such a timing indication. Then at block 404 the UE receives a grant (e.g., a PDCCH) that allocates multiple uplink subframes (e.g., PUSCHs) of which at least some may be shortened such that uplink transmission is prohibited in only a portion thereof. In an embodiment, if none of the subframes is shortened on the last symbol of subframe, and SRS is triggered, it is possible to use this combination to trigger SRS in UpPTS part of the UL transmission burst, i.e. in the DL partial ending subframe. When following this option, SRS triggering can follow parameters defined by the corresponding SRS parameter set. The only difference is that timing indication and parameter x is interpreted in a specific way. In other words, if none of the subframes is shortened on the last symbol of subframe, and SRS is triggered, UE will transmit SRS in the last symbol of subframe preceding the first scheduled uplink subframe. In the above examples those shortened UL subframes were those for which PUSCH transmissions in symbol position #13 were prohibited (that is, these subframes effectively ended at symbol position #12, unless the UE was to transmit an SRS in symbol position #13). Block 406 summarizes that based on the grant the UE determines which of the multiple uplink subframes are shortened; at block 408 the UE determines from the grant that a reference signal and/or CSI report is requested; and at block 410 the UE determines from the grant a selected one of the multiple parameter sets. Now at block 412 the UE identifies one uplink subframe from among the multiple uplink subframes based on the determination which of the multiple allocated uplink subframes are shortened. If there is at least one shortened subframe in the allocation then the UE will use the timing indication from the selected parameter set (in the above examples that was given by n=x, or by performing a modulo operation on x to resolve the value of n) to identify the one uplink subframe. If instead there are no such shortened subframes then this fact identifies the uplink subframe as the one preceding all of those UL subframes in the multi-subframe allocation. Finally at block 414 the UE transmits the reference signal and/or the CSI report, per the grant's request at block 408, in the identified uplink subframe.

FIG. 4A also sets forth actions performed by a device such as a UE or one or more components thereof, as well as functions done by such a UE as controlled by a tangibly embodied computer software program when such a program is executed by one or more processors of the UE.

Figure 4B:
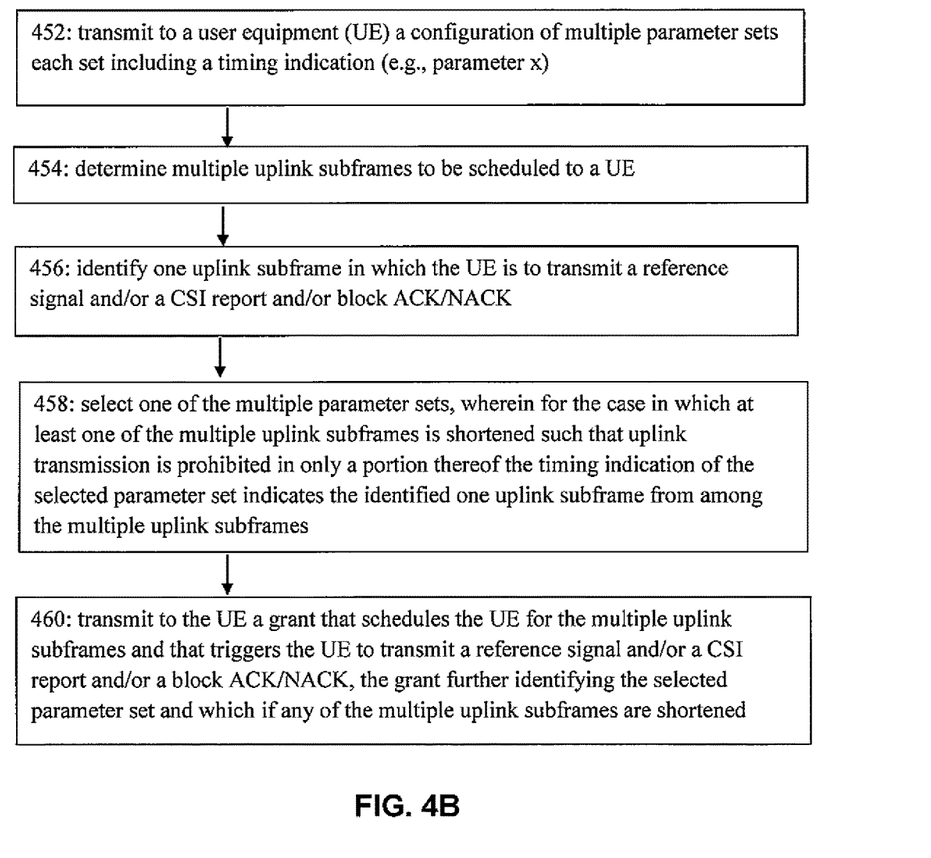

FIG. 4B is a process flow diagram that summarizes some of the above aspects from the perspective of the eNB or other network radio access node 20. FIG. 4B details a method for triggering transmission of a reference signal and/or a channel state information (CSI) report. The triggering is done by the eNB/radio access node and the UE is the entity that is triggered to transmit. In this summary at block 452 the eNB transmits to a UE a configuration of multiple parameter sets each set including a timing indication. The eNB determines at block 454 multiple uplink subframes that are to be scheduled to a UE. At least some of these multiple uplink subframes may be shortened such that uplink transmission is prohibited in only a portion thereof, as detailed above with numerous examples. The eNB further at block 456 identifies one shortened uplink subframe; this is the one subframe in which the UE is to transmit a reference signal and/or a CSI report and/or block ACK/NACK. The eNB then selects one of the multiple parameter sets at block 458. If at least one of the multiple uplink subframes is shortened then the parameter set is selected such that the corresponding timing indication indicates the identified one uplink subframe from among the multiple uplink subframes, and in the above examples this identified uplink subframe is always a shortened uplink subframe. This selection is for the value of n in the above examples, and since the timing indication gives the value of x this selection is highly dependent on whether the embodiment utilizes n=x or n=some modulo function on x (or other implementations). eNB may take into account also other UEs when assigning SRS parameter sets for an UE. It may also provide orthogonal SRS resources for all UEs triggered to send SRS during multi-subframe scheduling period of k subframes. The number of UEs triggered to send SRS during those k subframes may also impact eNB's decision how many shortened subframes it allocates during multi-subframe scheduling period of k subframes. For the case in which none of the multiple uplink subframes scheduled for the UE are shortened, then that fact points to a specific uplink frame preceding all of those multiple subframes as the one that is identified at block 456 for the UE to transmit its SRS and/or A-CSI and/or block ACK/NACK. Finally at block 460 the eNB transmits to the UE a grant that schedules the UE for the multiple uplink subframes and that triggers the UE to transmit a reference signal and/or a CSI report, the grant further identifying the selected parameter set and which of the multiple uplink subframes are shortened.

FIG. 4B also sets forth actions performed by a communication device such as a radio access node such as an eNB or one or more components thereof, as well as functions done by such an access node as controlled by a tangibly embodied computer software program when such a program is executed by one or more processors of that same access node.

Figure 5:
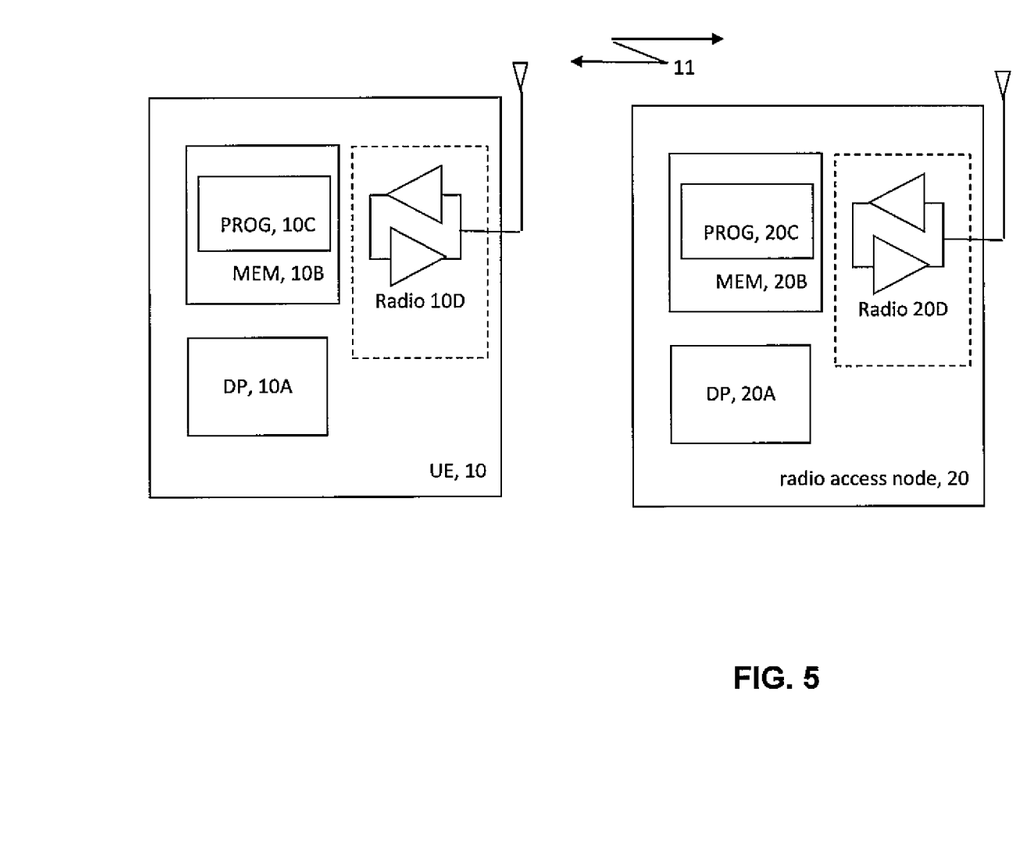
FIG. 5 is a high level schematic block diagram illustrating certain apparatus/devices that are suitable for practicing certain of these teachings.

FIG. 5 is a schematic diagram illustrating some components of the eNB/radio access node 20 and the UE 10 shown at FIG. 1. In the wireless system/cell a wireless network is adapted for communication over a wireless link 11 with an apparatus such as a mobile communication device which may be referred to as a UE 10, via a radio network access node such as a Node B (base station), and more specifically an eNB 20. The network may include a network control element (NCE, not shown) that may include mobility management entity/serving gateway (MME/S-GW) functionality, and which provides connectivity with a further network such as a telephone network and/or a data communications network (e.g., the internet).

The UE 10 includes a controller, such as a computer or a data processor (DP) 10D, a computer-readable memory medium embodied as a memory (MEM) 10B that stores a program of computer instructions (PROG) 10C, and a suitable wireless interface, such as radio frequency (RF) transmitter/receiver combination 10D for bidirectional wireless communications with the eNB 20 via one or more antennas.

The wireless link between the UE 10 and the eNB 20 can be measured for link quality (for example, received signal strength or quality) and this information is what is included in the A-CSI report that may be triggered according to the above teachings. Further, the UE 10 typically includes a galvanic power supply (or other portable power supply), it may have multiple antennas beyond only the single antenna shown, and the MEM 10B and DP 10A may be implemented as multiple distinct physical entities that operate in practice as a single unit, and it may have multiple distinct radios or one or more software-defined radios for communicating on different spectrum and using different radio access technologies.

The eNB 20 also includes a controller, such as a computer or a data processor (DP) 20A, a computer-readable memory medium embodied as a memory (MEM) 20B that stores a program of computer instructions (PROG) 20C, and a suitable wireless interface, such as RF transmitter/receiver combination 20D for communication with the UE 10 (as well as other UEs) via one or more antennas. The eNB 20 is coupled via a data/control path (not shown) to the NCE and this path may be implemented as an interface. The eNB 20 may also be coupled to another eNB via another data/control path, which may be implemented as a different interface. The eNB 20 typically has multiple antennas beyond only the single antenna shown, multiple distinct radios which may or may not include software-defined radios for communicating on different spectrum and using different radio access technologies, and like the UE 10 the MEM 20B and DP 20A of the eNB 20 may be implemented as multiple distinct physical entities that operate in practice as a single unit.

At least one of the PROGs 10C/20C is assumed to include program instructions that, when executed by the associated DP 10A/20A, enable the device to operate in accordance with exemplary embodiments of this invention as detailed above. That is, various exemplary embodiments of this invention may be implemented at least in part by computer software executable by the DP 10A of the UE 10; by the DP 20A of the eNB 20, or by hardware or by a combination of software and hardware (and firmware).

In various exemplary embodiments the UE 10 and/or the eNB 20 may also include dedicated processors, for example a RRC module, a RF front end, and the like. There may also be one or more modules that is/are constructed so as to operate in accordance with various exemplary embodiments of these teachings.

The computer readable MEMs 10B/20B may be of any type suitable to the local technical environment and may be implemented using any one or more suitable data storage technology, such as semiconductor based memory devices, flash memory, magnetic memory devices and systems, optical memory devices and systems, fixed memory and removable memory, electromagnetic, infrared, or semiconductor systems. Following is a non-exhaustive list of more specific examples of the computer readable storage medium/memory: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

The DPs 10A/20A may be of any type suitable to the local technical environment, and may include one or more of general purpose computers, special purpose computers, microprocessors, digital signal processors (DSPs) and processors based on a multicore processor architecture, as non-limiting examples. The wireless interfaces (e.g., the radios 10D/20D) may be of any type suitable to the local technical environment and may be implemented using any suitable communication technology such as individual transmitters, receivers, transceivers or a combination of such components.

In general, the various embodiments of the UE 10 can include, but are not limited to, smart phones, machine-to-machine (M2M) communication devices, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions. Any of these may be embodied as a hand-portable device, a wearable device, a device that is implanted in whole or in part, a vehicle-mounted communication device, and the like.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into an embodiment that is not specifically detailed herein as separate from the others. Accordingly, the description is intended to embrace all such alternatives, modifications and variances which fall within the scope of the appended claims.

The following abbreviations that may be found in the specification and/or the drawing figures are defined as follows:
3GPP Third Generation Partnership Project
ACK Acknowledgement
CSI Channel State Information
DCI Downlink Control Information
DL Downlink
eLAA Enhanced Licensed Assisted Access
eNB Evolved NodeB
ETSI European Telecommunications Standards Institute
FDD Frequency Division Duplex
FS2 Frame Structure 2 (frame structure for LTE TDD)
HARQ Hybrid Automatic Repeat reQuest
IFDMA Interleaved Frequency Domain Multiple Access
LAA Licensed Assisted Access
LBT Listen-Before-Talk
LTE Long Term Evolution
NACK Negative ACK
OFDM Orthogonal Frequency Domain Multiplexing
PCell Primary cell
PDCCH Physical Downlink Control Channel
PRB Physical Resource Block
PUCCH Physical Uplink Control Channel
PUSCH Physical Uplink Shared Channel
TB Transport Block
TM Transmission Mode
SCell Secondary cell
SRS Sounding reference signal
TDD Time Division Duplex
UE UE Equipment
UL Uplink

What is claimed is:

1. A method comprising:
receiving at a user equipment a configuration of multiple sounding reference signal parameter sets each set including a timing indication;
receiving at the user equipment being configured with the sounding reference signal parameter sets a grant that allocates multiple uplink subframes;
based on the grant, determining whether at least one of the multiple allocated uplink subframes is shortened such that uplink transmission is prohibited in only a portion thereof, and, if affirmative, which of the multiple uplink subframes are shortened;
determining from the grant that a sounding reference signal is requested;
determining from the grant a selected one of the sounding reference signal parameter sets;
identifying one uplink subframe based on the determination which of the multiple allocated uplink subframes are shortened and the timing indication of the selected sounding reference signal parameter set; and
transmitting the sounding reference signal as requested by the grant in the identified uplink subframe.

2. The method according to claim 1, wherein for the case in which it is determined that none of the multiple allocated uplink subframes are shortened, the identified uplink subframe immediately precedes all of the multiple allocated uplink subframes.

3. The method according to claim 1, wherein at least one of the multiple allocated uplink subframes is determined to be shortened, and the identified one uplink subframe is identified from among only the multiple allocated uplink subframes that are shortened using the timing indication from the selected parameter set.

4. The method according to claim 3, wherein the timing indication in each of the parameter sets indicates subframe timing relative to the multiple allocated uplink subframes.

5. The method according to claim 4, wherein identifying the one uplink subframe comprises counting among only the shortened uplink subframes a number of subframes equal to a value of the timing indication from the selected parameter set.

6. The method according to claim 4, wherein identifying the one uplink subframe comprises counting among only the shortened uplink subframes a number of subframes equal to the result of a modulo operation on a value of the timing indication from the selected parameter set and a total number of only shortened uplink frames among the multiple uplink frames.

7. An apparatus comprising:
at least one processor; and
at least one memory storing computer program code;
wherein the at least one processor is configured with the at least one memory and the computer program code to cause the apparatus to at least:
receive a configuration of multiple sounding reference signal parameter sets each set including a timing indication;
receive at the apparatus being configured with the sounding reference signal parameter sets a grant that allocates multiple uplink subframes;
determine based on the grant whether at least one of the multiple allocated uplink subframes is shortened such that uplink transmission is prohibited in only a portion thereof, and, if affirmative, which of the multiple uplink subframes are shortened;
determine from the grant that a sounding reference signal is requested;
determine from the grant a selected one of the sounding reference signal parameter sets;
identify one uplink subframe based on the determination which of the multiple allocated uplink subframes are shortened and the timing indication of the selected sounding reference signal parameter set; and
transmit the sounding reference signal as requested by the grant in the identified uplink subframe.

8. The apparatus according to claim 7, wherein for the case in which it is determined that none of the multiple allocated uplink subframes are shortened, the identified uplink subframe precedes all of the multiple allocated uplink subframes.

9. The apparatus according to claim 7, wherein at least one of the multiple allocated uplink subframes is determined to be shortened, and the identified one uplink subframe is identified from among only the multiple allocated uplink subframes that are shortened using the timing indication from the selected parameter set.

10. The apparatus according to claim 9, wherein the timing indication in each of the parameter sets indicates subframe timing relative to the multiple allocated uplink subframes.

11. The apparatus according to claim 10, wherein identifying the one uplink subframe comprises counting among only the shortened uplink subframes a number of subframes equal to a value of the timing indication from the selected parameter set.

12. The apparatus according to claim 10, wherein identifying the one uplink subframe comprises counting among only the shortened uplink subframes a number of subframes equal to the result of a modulo operation on a value of the timing indication from the selected parameter set and a total number of only shortened uplink frames among the multiple uplink frames.

13. The apparatus according to claim 7, wherein the reference signal and/or the CSI report and/or block acknowledgement is transmitted from one or more antenna ports that is/are identified by the selected one of the multiple parameter sets.

14. The apparatus according to claim 7, wherein the selected one of the multiple parameter sets is determined from a value of exactly 2 bits in the grant.

15. The apparatus according to claim 7, wherein the method is performed by a user equipment which transmits the reference signal and/or the CSI report and/or block acknowledgement on unlicensed radio spectrum.

16. A method comprising:
transmitting to a user equipment a configuration of multiple sounding reference signal parameter sets each set including a timing indication;
determining multiple uplink subframes to be scheduled to the user equipment;
identifying one uplink subframe in which the user equipment is to transmit a sounding reference signal;
selecting one of the multiple sounding reference signal parameter sets, wherein for the case in which at least one of the multiple uplink subframes is shortened such that uplink transmission is prohibited in only a portion thereof the timing indication of the selected parameter set indicates the identified one uplink subframe from among the multiple uplink subframes; and
transmitting to the user equipment being configured with the sounding reference signal parameter sets a grant that schedules the user equipment for the multiple uplink subframes and that triggers the user equipment to transmit a sounding reference signal, the grant further identifying the selected parameter set and which if any of the multiple uplink subframes are shortened.

17. The method according to claim 16, wherein the grant identifies that at least one of the multiple allocated uplink subframes is shortened, and the timing indication in each of the parameter sets indicates subframe timing relative to the multiple uplink subframes, and the timing indication of the selected parameter set along with the grant indicates the identified one uplink subframe.

18. An apparatus comprising:
at least one processor; and
at least one memory storing computer program code;
wherein the at least one processor is configured with the at least one memory and the computer program code to cause the apparatus to at least:
transmit to a user equipment a configuration of multiple sounding reference signal parameter sets each set including a timing indication;
determine multiple uplink subframes to be scheduled to the user equipment;
identify one uplink subframe in which the user equipment is to transmit a sounding reference signal;
select one of the multiple sounding reference signal parameter sets, wherein for the case in which at least one of the multiple uplink subframes is shortened such that uplink transmission is prohibited in only a portion thereof the timing indication of the selected parameter set indicates the identified one uplink subframe from among the multiple uplink subframes; and
transmit to the user equipment being configured with the sounding reference signal parameter sets a grant that schedules the user equipment for the multiple uplink subframes and that triggers the user equipment to transmit a sounding reference signal, the grant further identifying the selected parameter set and which if any of the multiple uplink subframes are shortened.

19. The apparatus according to claim 18, wherein for the case in which the grant identifies that none of the multiple allocated uplink subframes are shortened, the identified uplink subframe precedes all of the multiple allocated uplink subframes.

20. The apparatus according to claim 18, wherein the grant identifies that at least one of the multiple allocated uplink subframes is shortened.

21. The apparatus according to claim 20, wherein the timing indication in each of the parameter sets indicates subframe timing relative to the multiple uplink subframes, and the timing indication of the selected parameter set along with the grant indicates the identified one uplink subframe.

22. The apparatus according to claim 21, wherein selecting the one of the multiple parameter sets comprises selecting one of the parameter sets for which a value of the corresponding timing indication equals a count among only the shortened uplink subframes to the identified one uplink subframe which is a shortened uplink subframe.

23. The apparatus according to claim 21, wherein selecting the one of the multiple parameter sets comprises selecting one of the parameter sets for which a result of a modulo operation on a value of the corresponding timing indication and a total number of only shortened uplink frames among the multiple uplink frames equals a count among only the shortened uplink subframes to the identified one uplink subframe which is a shortened uplink subframe.

24. The apparatus according to claim 18, wherein selected one of the multiple parameter sets identifies one or more antenna ports of the UE from which the reference signal and/or the CSI report and/or block acknowledgement is to be transmitted.

25. The apparatus according to claim 18, wherein the grant identifies the selected parameter set using exactly 2 bits.

26. The apparatus according to claim 18, wherein the method is performed by a radio access node which transmits the grant on unlicensed radio spectrum.

\* \* \* \* \*